J. J. McINTYRE.
AIR PUMP.
APPLICATION FILED FEB. 28, 1911.

1,001,667.

Patented Aug. 29, 1911.

Witnesses:
Josephine K. Strempfer
Eva L. Stoughton

Inventor:
John J. McIntyre
by Harry R. Williams
atty.

UNITED STATES PATENT OFFICE.

JOHN J. McINTYRE, OF HARTFORD, CONNECTICUT.

AIR-PUMP.

1,001,667. Specification of Letters Patent. Patented Aug. 29, 1911.

Application filed February 28, 1911. Serial No. 611,483.

*To all whom it may concern:*

Be it known that I, JOHN J. McINTYRE, a citizen of the United States, residing at Hartford, in the county of Hartford and State of Connecticut, have invented a new and useful Improvement in Air-Pumps, of which the following is a specification.

This invention relates to an air pump which is particularly designed to be attached to the chassis of a motor vehicle for providing compressed air which may be used for operating a motor starting apparatus, or the steering mechanism, or brakes, or for the inflation of tires and blowing of a whistle or horn, but, of course, the pump may be used in other places. The chassis frames of the many styles of automobiles in common use, vary much in design and construction, and the available space for attaching an independent pumping device is very limited.

The object of this invention is to provide a very light, simple and efficient pump, having few parts, which is provided with a support so designed that it may be conveniently attached to a frame-bar, or other part of the chassis, or to a piece attached thereto, and readily set in the necessary relation to the motor mechanism which it is desired to employ for driving it. The pump shown is especially designed so that it may be attached to nearly every car in common use, and be driven from the cam shaft or magneto shaft of the engine.

Figure 1:
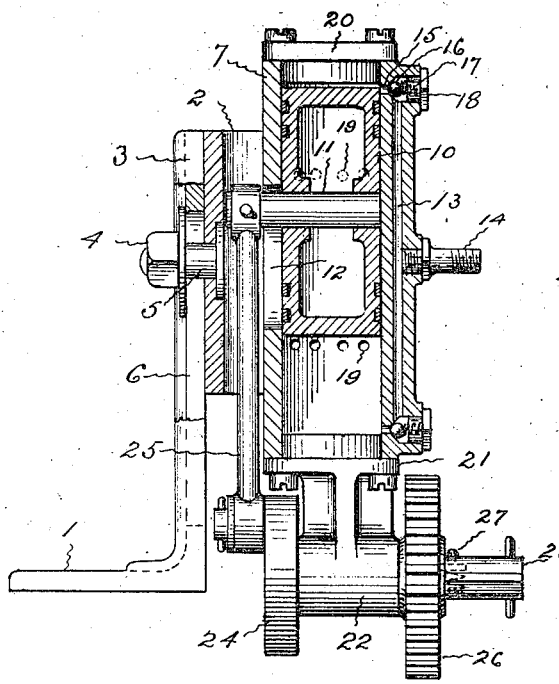
Figure 2:
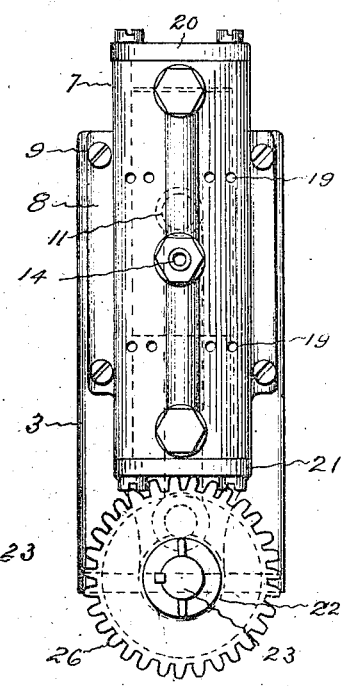
Figure 3:
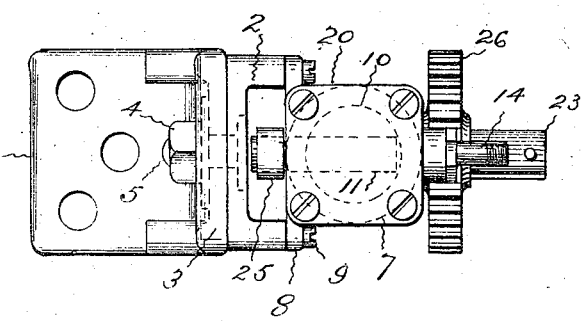
Figure 4:
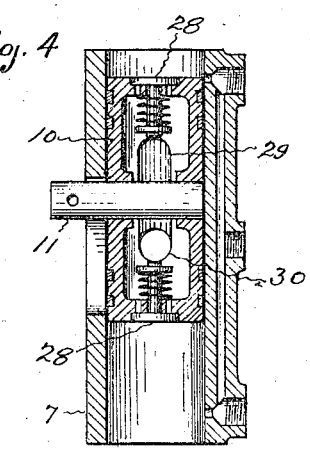

Figure 1 of the accompanying drawings shows a side elevation, with parts in central section, of a pump which embodies this invention. Fig. 2 shows a front view of the pump. Fig. 3 shows a plan of the same. Fig. 4 shows a longitudinal section of a cylinder and piston of modified form.

The supporting bracket has a base 1, which is designed to be clamped or bolted to a convenient part of the chassis, or to a piece attached thereto, in proximity to the motor. A cylinder-carrying yoke 2 is adjustably secured to the face of the upright 3 of the supporting bracket, by means of a nut 4 that turns on the bolt 5 which extends through the yoke and the slot 6 in the upright.

The cylinder 7 has flanges 8 that are fastened by screws 9 to the edges of the yoke. Movable in the cylinder is a double acting piston 10. This piston has a stud 11 projecting laterally from the middle, through a slot 12 in the back wall of the cylinder. In the front wall of the cylinder is a passage 13, and opening from this passage through the nipple 14 is the discharge outlet. At the upper and lower ends of the cylinder and communicating with the passage 13 are ports 15, controlled by valves 16 normally held closed by springs 17 that are seated in the screw plugs 18. Through the side walls of the cylinder, above and below the middle, are perforations 19 which form the intake ports. One end of the cylinder is closed by a head 20, and the other end is closed by a head 21, on which is a bearing 22. Turning in this bearing is a shaft 23, attached to one end of which is a crank 24. A rod 25 connects this crank with the stud that projects laterally from the middle of the piston through the rear wall of the cylinder. Splined upon the shaft may be a pulley or gear. If it is desired to have the pump driven from a gear on the magneto or cam shaft of the motor, the driving member that is splined upon the pump shaft may be a gear 26 as is shown in the drawings. This gear may be held in place by any suitable means, desirably a spring pin 27.

In some cases, more especially in larger sizes of the pump, it may be desirable to place valves 28 in the ends of the piston, as is illustrated in Fig. 4. With this construction an elongated opening 29 may be made through the wall of the piston in such position that it always communicates with the intake port 30 through the side of the cylinder.

This pump may be located adjacent to the motor so that it will gear with the desired driving part, and then the supporting bracket may be turned at the necessary angle and drawn along the yoke the required distance until the base of the bracket is in position to be fastened to the most convenient part of the chassis. After the pump has been located so as to properly gear with the driving part, and the supporting bracket has been secured in place, the nut 4 may be turned on the bolt 5 so as to clamp the yoke and the upright of the bracket together. The yoke which carries the cylinder and all of the active mechanism, may be turned around on the bolt and clamped at any angle, with relation to the upright of the bracket, within an entire circle, and it may be moved longitudinally along the upright within the limits of the slot therein through which the bolt extends. This permits the pump to be located properly with relation to the driving gear, and the supporting bracket to be adjusted so that it can be readily attached to any convenient part of the chassis in the vicinity of the motor.

When the parts are secured in position, and the gears are in driving engagement, the rotation of the crank shaft, through the connecting rod and stud, reciprocates the piston in the cylinder and forces the air first from one end and then the other end of the cylinder through the discharge passage. With the construction described, the connecting rod and crank are shielded by the bracket and the yoke. There are few parts to this pump and the action is easy, for the piston is reciprocated by moving the piston stud back and forth in the open slot. Friction is reduced to a minimum, as no packing is required, for it is not necessary that the piston stud fit tightly in the slot in the cylinder wall.

The invention claimed is:

1. An air pump having a supporting bracket, a cylinder rotarily supported by the bracket and adjustable longitudinally thereof, a piston movable in the cylinder, a stud extending transversely from the piston through a slot in the wall of the cylinder, a crank shaft and crank, and a rod connecting the crank and said piston stud.

2. An air pump having a supporting bracket, a yoke movable along and rotatable on the bracket, a cylinder secured to the yoke, a piston movable in the cylinder, a stud extending transversely from the middle of the piston through a slot in the wall of the cylinder, heads for the cylinder, a bearing attached to one of the heads, a shaft supported by said bearing, a crank on the shaft, and a rod connecting the crank and the stud projecting from the piston.

3. An air pump having a cylinder, a piston movable in the cylinder, a stud extending transversely from the piston, a shaft, a crank on the shaft, a rod connecting the crank and the stud extending from the piston, a yoke secured to the back of the cylinder, and a supporting bracket longitudinally adjustable along the yoke.

4. An air pump having a cylinder, a piston movable in the cylinder, a stud extending transversely from the piston through the back of the cylinder, a shaft supported by the cylinder, a crank on the shaft, a rod connecting the crank and the stud extending from the piston, a yoke carrying the cylinder, and a supporting bracket secured to the yoke and rotarily and longitudinally adjustable with relation thereto.

5. An air pump having a cylinder, a piston movable in the cylinder, a stud extending transversely from the piston, a bearing attached to the cylinder, a shaft held by the bearing, a gear on the shaft at one side of the bearing, a crank on the shaft at the other side of the bearing, a rod connecting the crank and the stud extending from the piston, a yoke secured to the cylinder, a slotted supporting bracket, a bolt extending through the yoke and the slot in the bracket, and a nut turning on said bolt for securing the yoke and bracket together.

6. An air pump having a cylinder with outflow ports near its upper and lower ends, a passage connecting said ports, a discharge opening from said passage, intake ports through its sides and a slot through its back, valves controlling said ports, a double acting piston movable in the cylinder, a stud extending transversely from the middle of the piston through said slot in the back of the cylinder, heads at the ends of the cylinder, a bearing secured to one of said heads, a shaft supported by said bearing, a crank on the shaft, a rod back of the cylinder and connecting the crank and the stud extending from the piston, a yoke secured to the back of the cylinder, and a supporting bracket rotarily and longitudinally adjustably attached to said yoke.

7. An air pump having a cylinder, a piston movable in the cylinder, a shaft, a crank on the shaft, means connecting the crank and the piston, a yoke carrying the cylinder, shaft, crank, and connecting means, and a supporting bracket rotarily connected with and longitudinally adjustable along the yoke.

JOHN J. McINTYRE.

Witnesses:
JOSEPHINE M. STREMPFER,
HARRY R. WILLIAMS.